United States Patent
Bouwmeester et al.

(10) Patent No.: US 6,838,417 B2
(45) Date of Patent: Jan. 4, 2005

(54) COMPOSITIONS AND METHODS INCLUDING FORMATE BRINES FOR CONFORMANCE CONTROL

(75) Inventors: Ron C. M. Bouwmeester, Oude Wetering (NL); Klaas A. W. Van Gijtenbeek, Benneveld (NL)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/163,049

(22) Filed: Jun. 5, 2002

(65) Prior Publication Data

US 2004/0035580 A1 Feb. 26, 2004

(51) Int. Cl.[7] .............................................. C09K 7/02
(52) U.S. Cl. ........................ 507/203; 507/221; 507/224; 507/225; 507/239; 507/267
(58) Field of Search .................. 507/203, 221, 507/224, 225, 239, 267

(56) References Cited

U.S. PATENT DOCUMENTS

| | | | |
|---|---|---|---|
| 3,491,049 A | 1/1970 | Daniel et al. | 260/29.2 |
| 4,773,481 A | 9/1988 | Allison et al. | 166/270 |
| 5,480,933 A | 1/1996 | Fox et al. | 524/554 |
| 5,617,920 A | 4/1997 | Dovan et al. | 166/295 |
| 5,785,747 A * | 7/1998 | Vollmer et al. | 106/194.2 |
| 5,789,350 A * | 8/1998 | Moradi-Araghi et al. | 507/203 |
| 5,804,535 A * | 9/1998 | Dobson et al. | 507/111 |
| 6,192,986 B1 | 2/2001 | Urlwin-Smith | 166/295 |
| 6,196,317 B1 | 3/2001 | Hardy | 166/295 |
| 6,656,989 B1 * | 12/2003 | Benton et al. | 524/394 |
| 2002/0008225 A1 | 1/2002 | Smith | 252/73 |
| 2003/0114317 A1 * | 6/2003 | Benton et al. | 507/200 |

* cited by examiner

Primary Examiner—Philip C. Tucker
(74) Attorney, Agent, or Firm—Robert A. Kent; Todd E. Albanesi

(57) ABSTRACT

Compositions and methods are provided for reducing the permeability of subterranean zones. More particularly, water-soluble polymeric compositions which form cross-linked gels in the zones. In general, the composition comprises (a) at least one water-soluble polymer; (b) at least one organic gelling agent capable of cross-linking the water-soluble polymer; and (c) at least one water-soluble formate. More preferably, the water-soluble polymer is a copolymer of (i) at least one non-acidic ethylenically unsaturated polar monomer, and (ii) at least one copolymerisable ethylenically unsaturated ester. The gelling agent is preferably selected from the group consisting of a polyalkyleneimine, polyfunctional aliphatic amine, an aralkylamine, and a heteroaralkylamine. The preferred water-soluble formate is selected from the group consisting of ammonium formate, lithium formate, sodium formate, potassium formate, rubidium formate, cesium formate, and francium formate. Water is used to make an aqueous composition prior to use in a subterranean formation. The methods of this invention for reducing the permeability of a subterranean zone are comprised of the steps of introducing an aqueous composition according to the invention into a subterranean zone, and then allowing the aqueous composition to form a cross-linked gel in the zone. Preferably, the method includes the step of subsequently producing hydrocarbons from the subterranean formation.

24 Claims, 2 Drawing Sheets

COMPOSITIONS AND METHODS INCLUDING FORMATE BRINES FOR CONFORMANCE CONTROL

BACKGROUND OF THE INVENTION

1. Field of the Invention

The present invention relates to compositions and methods for reducing the permeabilities of subterranean zones, also known as conformance control, and, more particularly, to improved water-soluble polymeric compositions which form cross-linked gels in the zones.

2. Discussion of Related Art

When wells penetrating oil and gas producing subterranean formations are produced, water often accompanies the oil and gas. The water can be the result of a water producing zone communicated with the oil and gas producing formation by fractures, high permeability streaks and the like, or it can be caused by a variety of other occurrences which are well known to those skilled in the art such as water coning, water cresting, bottom water, channeling at the well bore, etc. In addition, secondary recovery techniques such as water flooding to stimulate production of oil involve injection of water under pressure at a distance from a production well to squeeze the oil out. However, in both cases the water moves in the formation along least hindered paths, so that the recovery technique may be inefficient, and, in the direct recovery, increased proportions of water are produced.

In enhanced recovery techniques such as water flooding, an aqueous flood or displacement fluid is injected under pressure into an oil containing subterranean formation by way of one or more injection wells. The flow of the aqueous fluid through the formation displaces oil contained therein and drives it to one or more producing wells. However, the aqueous displacement fluid often flows through the most permeable zones in the subterranean formation whereby less permeable zones containing oil are bypassed. This uneven flow of the aqueous displacement fluid through the formation reduces the overall yield of hydrocarbons from the formation.

Heretofore, enhanced recovery problems in a subterranean oil containing formation caused by permeability variations therein have been corrected by reducing the permeability of the subterranean formation flow paths having high permeability and low oil content. As a result, the subsequently injected aqueous displacement fluid is forced through flow paths having low permeability and high oil content. The techniques utilized to accomplish this high flow path permeability reduction, referred to in the art as "conformance control techniques," have included injecting aqueous solutions of polymers and gelling agents into the high permeability flow paths whereby the polymers are gelled and cross-linked therein.

For example, water-soluble polymers including copolymers of acrylamide and acrylic acid cross-linked with chromium or other transition metal ions have been utilized heretofore. In accordance with an early technique, an aqueous solution of one or more of the polymers or copolymers mixed with a cross-linking metal ion is injected into the subterranean formation and allowed to cross-link therein. However, it has heretofore been found that the cross-linked gels formed have often been ineffective at high temperatures, i.e., at temperatures above about 80 EC because of the instability of the cross-linker or polymer. This has resulted in uncontrolled cross-linking rates (too rapid), cross-linker precipitation, polymer degradation, or an inefficient solution propagation. In attempts to correct these problems, the cross-linking metal ion has been coordinated with a ligand such as acetate or propionate to slow the reaction of the metal ion with the polymer. While this and other techniques have been utilized successfully, the use of some metal ions, e.g., chromium, has adverse environmental effects, and the metal ion used can be adsorbed by formation materials whereby it is prevented from functioning to cross-link the polymer.

U.S. Pat. No. 4,773,481 to Allison et al. issued on Sep. 27, 1988 describes a process for reducing the permeability of a subterranean formation by the cross-linking of water-soluble polymers of polyalkyleneimines and polyalkylenepolyamines with certain polymers which are anionic or hydrolyzable to form anionic polymers. Examples of the anionic polymers are polyacrylamide and alkylpolyacrylamides, copolymers of polyacrylamide and alkylpolyacrylamides with ethylene, propylene and styrene, polymaleic anhydride and polymethylacrylate, and hydrolysis products thereof. As described in the patent, when the water-soluble polymer and the anionic polymer are mixed, a viscous gel is quickly formed. In use, a solution of the water-soluble polymer is pumped into the subterranean formation first, followed by water to displace the water-soluble polymer from the wellbore to thereby prevent premature gelling upon introduction of the anionic polymer. Thereafter, the anionic polymer is pumped into the formation. This three-step procedure has a number of disadvantages in practice and is costly to perform, but it is necessary because the water-soluble polyalkylene imine or polyalkylenepolyamine reacts very quickly with the anionic polymer and cannot be premixed without premature gelation.

U.S. Pat. No. 6,192,986 to Phillip Lance Urlwin-Smith issued on Feb. 27, 2001 and assigned of record to Halliburton Energy Services, Inc., the specification of which is incorporated herein by reference in its entirety, describes a way of avoiding the use of metal ion cross-linking agents and of controlling the gelling rate of polymers whereby premixes of polymer and a gelling agent can be made and safely injected into a downhole formation without serious risk of premature gelation. The composition comprises a water-soluble copolymer comprising (i) at least one non-acidic ethylenically unsaturated polar monomer and (ii) at least one copolymerisable ethylenically unsaturated ester; and (iii) at least one organic gelling agent, characterized in that the gelling agent is a polyalkyleneimine, polyfunctional aliphatic amine, an aralkylamine, or a heteroaralkylamine. The gelling agents are free from metal ions, and are preferably water-soluble polymers capable of cross-linking the copolymers. Among the preferred water-soluble polymers for use as gelling agents are polyalkyleneimines, polyalkylenepolyamines, and mixtures thereof. Additional details concerning these polymers and their preparation are disclosed in U.S. Pat. No. 3,491,049. The preferred polyalkylenepolyamines are the polymeric condensates of lower molecular weight polyalkylenepolyamines and a vicinal dihaloalkane. The polyalkyleneimines are best illustrated by polymerized ethylene imines or propylene imine. The polyalkylenepolyamines are exemplified by polyethylene and polypropylenepolyamines. Other gelling agents which can be used include water-soluble polyfunctional aliphatic amines, aralkylamines, and heteroaralkylamines optionally containing other hetero atoms. The method of conformance control of a subterranean reservoir comprises: (a) injecting into a formation an aqueous solution of a composition of the invention; (b) allowing the solution to flow through at least one permeable zone in said formation; and (c) allowing the composition to gel. It is generally unnecessary to have any pre-cool step, especially in wells with bottom hole temperatures up to about 120° C. As the solution is pumped downhole and permeates into the zone, it heats up and eventually reaches the downhole temperature after which gelling occurs.

U.S. Pat. No. 6,196,317 to Mary Anne Hardy issued on Mar. 6, 2001 and assigned of record to Halliburton Energy Services, Inc., the specification of which is incorporated herein by reference in its entirety, describes the steps of introducing an aqueous solution of a chelated organic gelling agent and a copolymer of an ethylenically unsaturated polar monomer and an ethylenically unsaturated ester into a subterranean zone, and then allowing the aqueous solution to form a cross-linked gel in the zone. The chelated organic gelling agent is comprised of a water-soluble polyalkylene imine chelated with a metal ion, preferably polyethylene imine chelated with zirconium. The ethylenically unsaturated polar monomer in the copolymer is an amide of an unsaturated carboxylic acid, preferably acrylamide, and the ethylenically unsaturated ester in the copolymer is formed of a hydroxyl compound and an ethylenically unsaturated carboxylic acid such as acrylic acid, methacrylic acid and the like. A preferred unsaturated ester is t-butyl acrylate. In a further aspect, instead of utilizing the above-described copolymer which is rapidly cross-linked by the chelated gelling agent once the chelated gelling agent disassociates, the copolymer can be stabilized whereby it does not cross-link as rapidly at high temperatures and also has greater long-term gel strength after being cross-linked by forming it into a terpolymer or a tetrapolymer. That is, instead of a copolymer, the above-described ethylenically unsaturated polar monomer, preferably acrylamide, and the ethylenically unsaturated ester, preferably t-butyl acrylate, are reacted with AMPS® (2-acrylamido-2-methylpropane sulfonic acid) and/or N-vinylpyrrolidone to produce a terpolymer, e.g., polyacrylamide/t-butyl acrylate/AMPS® or polyacrylamide/t-butyl acrylate/N-vinylpyrrolidone or a tetrapolymer, e.g., polyacrylamide/t-butyl acrylate/AMPS®/N-vinylpyrrolidone. The most preferred terpolymer is polyacrylamide/t-butyl acrylate/N-vinylpyrrolidone. The compositions for reducing the permeability of a subterranean zone are basically comprised of water, a copolymer of an ethylenically unsaturated polar monomer, and an ethylenically unsaturated ester or a terpolymer or tetrapolymer of the aforesaid polar monomer and ester with AMPS® and/or N-vinylpyrrolidone, and a chelated organic gelling agent.

Although the above-described water-based polymer systems cross-linked with organic cross-linkers have some thermal stability at higher temperatures, further stability improvement is desirable. The maximum pumping time of those systems, when used as matrix sealants in conformance applications, is limited by the short cross-link time at formation temperature. This makes application of such systems in wells with a higher BHST or low injectivity in many cases unfeasible due to the large cooldown volumes required. At higher temperatures, the adjustment of pH and other known methods to delay the cross-link time at lower temperatures do not show any effect.

Another limitation on the use of the existing compositions and methods is the density of the fluids used. For example, the commonly used calcium chloride and calcium bromide brines are not feasible for mixing with such water-based polymer systems because they precipitate out the polymer.

There are continuing needs, however, for improved compositions and methods for reducing the permeabilities of subterranean zones using water-soluble polymeric components whereby the cross-linking of the components is effectively and simply controlled at high temperatures. There is also a continuing need for improved compositions and methods that enable higher density fluid mixtures than heretofore could be achieved.

SUMMARY OF THE INVENTION

The present invention provides compositions for reducing the permeabilities of subterranean zones at high temperatures which meet the needs described above and increase delay of the cross-link time.

In one aspect, the invention provides a composition for use in a subterranean formation, the composition comprising: (a) at least one water-soluble polymer; (b) at least one organic gelling agent capable of cross-linking the water-soluble polymer; and (c) at least one water-soluble formate.

In a further aspect, the invention provides a composition for use in a subterranean formation, the composition comprising: (a) at least one water-soluble polymer further comprising a polymer of at least one non-acidic ethylenically unsaturated polar monomer; (b) at least one organic gelling agent capable of cross-linking the water-soluble polymer; and (c) at least one water-soluble formate.

In a further aspect, the invention provides a composition for use in a subterranean formation, the composition comprising: (a) at least one water-soluble polymer further comprising a polymer of at least one non-acidic ethylenically unsaturated polar monomer; (b) at least one organic gelling agent capable of cross-linking the water-soluble polymer; and (c) at least one water-soluble formate selected from the group consisting of ammonium formate, lithium formate, sodium formate, potassium formate, rubidium formate, cesium formate, and francium formate.

In a still further aspect, the invention provides a composition for use in a subterranean formation, the composition comprising: (a) at least one water-soluble polymer further comprising a polymer of at least one non-acidic ethylenically unsaturated polar monomer; (b) at least one organic gelling agent selected from the group consisting of a polyalkylene imine, polyfunctional aliphatic amine, an aralkylamine, and a heteroaralkylamine; and (c) at least one water-soluble formate.

In another further aspect, the invention provides a composition for use in a subterranean formation, the composition comprising: (a) at least one water-soluble polymer further comprising a copolymer of: (i) at least one non-acidic ethylenically unsaturated polar monomer, and (ii) at least one copolymerisable ethylenically unsaturated ester; (b) at least one organic gelling agent capable of cross-linking the water-soluble polymer; and (c) at least one water-soluble formate.

In another further aspect, the invention provides a composition for use in a subterranean formation, the composition comprising: (a) at least one water-soluble polymer further comprising a copolymer of: (i) at least one non-acidic ethylenically unsaturated polar monomer, and (ii) at least one copolymerisable ethylenically unsaturated ester; (b) at least one organic gelling agent selected from the group consisting of a polyalkyleneimine, polyfunctional aliphatic amine, an aralkylamine, and a heteroaralkylamine; and (c) at least one water-soluble formate.

Preferably, the water-soluble formate is selected from the group consisting of potassium formate and cesium formate ammonium formate, lithium formate, sodium formate, potassium formate, rubidium formate, cesium formate, and francium formate.

The compositions according to the various aspects of the invention will be formulated with water as an aqueous composition prior to use in a subterranean formation. The composition may be formulated as a dry premix that is mixed with water before use.

Besides the observed delay in cross-link time, the use of formate brines also enables higher density fluid mixtures which previously could not be achieved.

In another aspect, the invention provides a method of conformance control of a subterranean reservoir, which comprises: (a) introducing a composition according to the invention into a subterranean zone; and (b) allowing the composition to gel. Preferably, the method further comprises the step of subsequently producing hydrocarbons from the well.

In the method of the invention, it will sometimes be possible to reduce the volume of the pre-cool stage and consequently the time required to conduct the pre-cool step. As the solution is pumped downhole and permeates into the zone, it heats up and eventually reaches the downhole temperature after which gelling occurs. According to the present invention, the permeability of the zone is preferably high, but it can be also be low, down to about 5 mD.

BRIEF DESCRIPTION OF THE FIGURES

The accompanying views of the drawing are incorporated into and form a part of the specification to illustrate several aspects and examples of the present invention. These figures together with the description serve to explain the principals of the invention. The figures are only for the purpose of illustrating preferred and alternative examples of how the various aspects of the invention and are not to be construed as limiting the invention to only the illustrated and described examples. The various advantages and features of the various aspects of the present invention will be apparent from a consideration of the drawings in which.

DETAILED DESCRIPTION OF THE INVENTION

Figure 1:
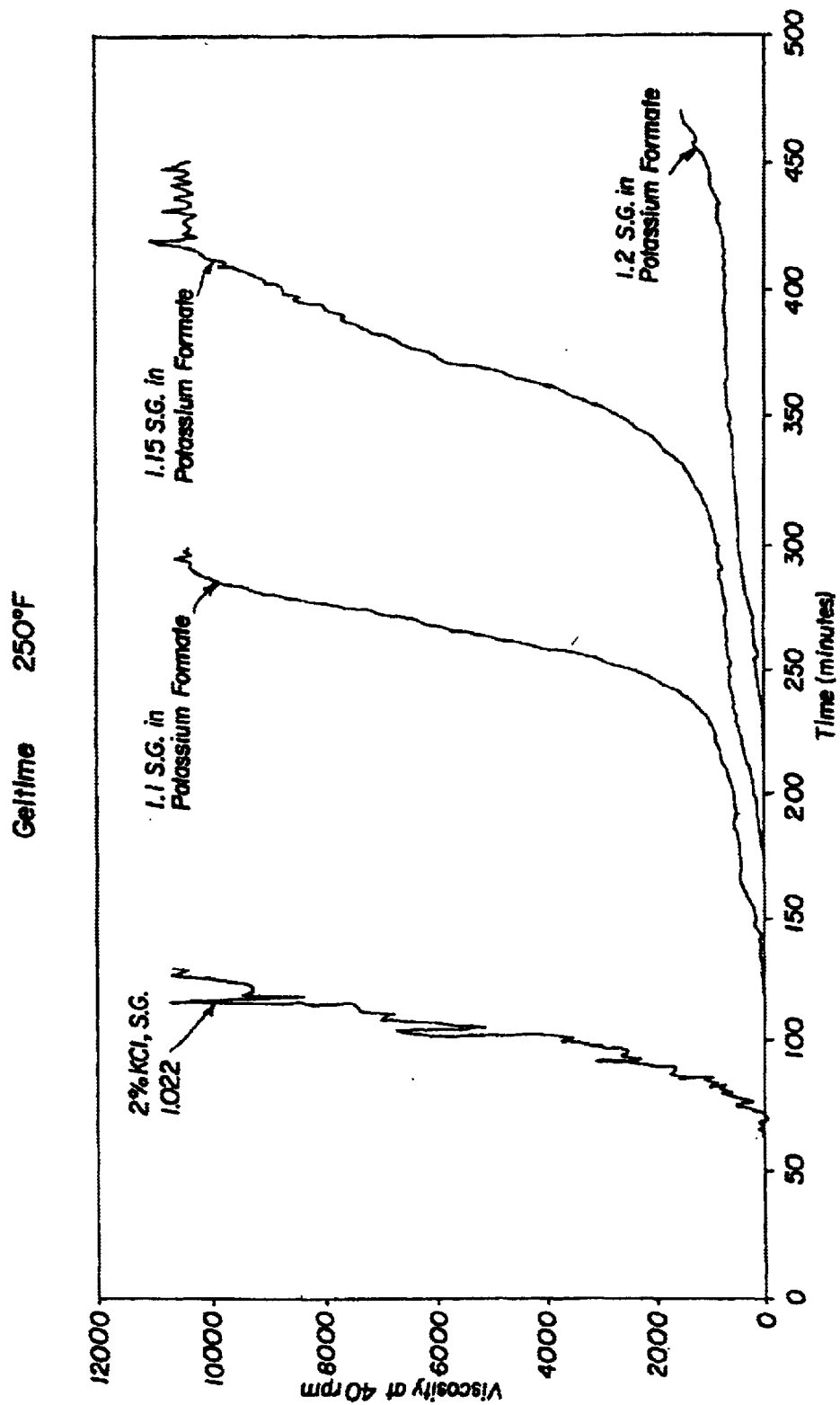
FIG. 1 is a graph of the experimental data obtained for the cross-link time delay at 120 EC (250 EF) for the potassium chloride control vs. compositions with potassium formate.

As mentioned, the compositions of this invention for reducing the permeability of a subterranean zone are basically comprised of (a) at least one water-soluble polymer; (b) at least one organic gelling agent capable of cross-linking the water-soluble polymer; (c) at least one water-soluble formate; and (d) water.

The water-soluble polymers useful in the compositions of this invention are formed from at least one ethylenically unsaturated polar monomer. More preferably, the polymer is a copolymer of at least one ethylenically unsaturated ester and at least one ethylenically unsaturated ester.

(i) Ethylenically Unsaturated Polar Monomer

The ethylenically unsaturated polar monomer may be derived from an unsaturated carboxylic acid wherein the unsaturated group is vinyl or alpha methyl vinyl. The polar monomer formed from the acid is non-acidic and is preferably a primary, secondary, or tertiary amide of the unsaturated carboxylic acid. The amide can be derived from ammonia or a primary or secondary alkylamine, e.g., an alkyl amine having from 1 to 10 carbon atoms which may also be substituted by at least one hydroxyl group. That is, the amide of the acid can be an alkanol amide such as ethanolamide. Examples of suitable ethylenically unsaturated polar monomers are acrylamide, methacrylamide, and acrylic ethanol amide. The ethylenically unsaturated polar monomer may also be a vinyl heterocyclic compound with at least an oxygen, sulfur, or nitrogen atom in a ring with 3 to 8 carbon atoms, such as one with at least one carbonyl group in the ring, e.g., N-vinylpyrrolidone, caprolactam, or a vinyl pyridine.

(ii) Copolymer with Ethylenically Unsaturated Ester

The presence of the ester moiety in polymers for use in the invention is expected to be unnecessary since the formate delays the gelling reaction and thus enables the copolymer to be premixed with gelling agent before being pumped downhole. If the ester moiety is included in the copolymer, we prefer that the ester group be such as to provide steric hindrance and, for this purpose, bulky ester groups such as t-butyl, for example, are preferred. The precise delay in cross-linking and gelation caused by the ester group will vary from copolymer to copolymer, as will be clear to those skilled in the art. Some experimental trial may, therefore, be necessary to determine the optimum with any particular copolymer. The nature and amount of the ester will be such as to provide a delay in the gelation (compared to a homopolymer omitting any ester component), sufficient, for example, to enable a premix to be pumped into a formation without premature gelling.

The ethylenically unsaturated esters which can be used with the ethylenically unsaturated polar monomer described above to form a copolymer are formed from a hydroxyl compound and an ethylenically unsaturated carboxylic acid. The ethylenically unsaturated group is preferably in the alpha to beta or the beta to gamma position relative to the carboxyl group. Preferred acids have in the range of from 3 to 20 carbon atoms. Examples of these acids are acrylic acid, methacrylic acid, crotonic acid, and cinnamic acids.

The hydroxyl compound is preferably an alcohol of the formula ROH, where R is a hydrocarbyl group. Preferred hydrocarbyl groups are alkyl groups having from 1 to 30 carbon atoms, alkenyl groups having from 2 to 20 carbon atoms, cycloalkyl groups having from 5 to 8 carbon atoms, aryl groups such as aromatic hydrocarbyl groups having from 6 to 20 carbon atoms, and arylalkyl groups having from 7 to 24 carbon atoms. Specific examples of R groups are methyl, ethyl, propyl, butyl, amyl, hexyl, octyl, 2-ethylhexyl and decyl (including all stereoisomers), allyl, cyclohexyl, palmityl, stearyl, phenyl, and benzyl. The R group may also be a hydrocarbyl group substituted by at least one, e.g., from 1 to 3 substituents, such as hydroxyl, ether, and thioether groups. Electron donating group substituents are preferred. Ether substituents are also preferred, especially alkoxy, aryloxy, and arylalkoxy in which the alkyl, aryl, and arylalkyl groups may be as described above. Preferably, the substituent is on the same carbon atom of the R group as is bonded to the hydroxyl group in the hydroxyl compound with alkoxymethyl and arylalkyloxy methyl groups being preferred. The hydroxyl compound may be a primary, secondary, iso, or tertiary compound, preferably with a tertiary carbon atom bonded to the hydroxyl group, e.g., tert-butyl and trityl. The R group may also comprise a heterocyclic group either for bonding directly to the hydroxyl group of ROH or separated therefrom by an alkylene group having 1 to 4 carbon atoms such as methylene. Thus, the R group may be a saturated or unsaturated heterocyclic or heterocyclic alkylene group, e.g., having 3 to 8 carbon atoms and at least one or two ring heteroatoms selected from oxygen, nitrogen, and sulfur. Examples of such groups are furyl, tetrahydrofuryl, furfuryl and tetrahydrofurfuryl, pyranyl, and tetrahydropyranyl. Preferred R groups are tert-butyl, trityl, methoxymethyl, benzyloxymethyl, and tetrahydropyranyl. Other less preferred R groups include stearyl, isopropyl, ethyl, and methyl. The most preferred ester is t-butyl ester.

The ester is preferably substantially neutral as a fully esterified derivative of an acid, i.e. complete ester, rather than a partial ester with free acid groups.

The copolymer can contain from about 0.01 to about 50 mole percent of the polar monomer and from about 50 to about 99.99 mole percent of the ester monomer. More preferably, the polar monomer is present in the copolymer in an amount of about 85 to about 95 mole percent with the ester monomer being present in an amount of from about 5 to about 15 mole percent. The copolymer may be a block or non-block copolymer, a regular or random copolymer, or a graft copolymer whereby the ester units are grafted onto a polymerized polar monomer, e.g., the ester grafted onto polyacrylamide.

In the more preferred compositions of the invention, the copolymer is formed from at least one polar monomer, preferably from 1 to 3 monomers, and at least one, preferably from 1 to 3, esters, and comprises structural units derived from said monomer(s) and ester(s). Most preferably, the copolymer consists essentially of said structural units.

The copolymer can be produced by conventional methods for copolymerizing ethylenically unsaturated monomers in solution, emulsion, or suspension.

(iii) Alternative Copolymer

In order to slow down the cross-linking of the polymer composition and increase its gel strength after it is cross-linked, a terpolymer or tetrapolymer of the above-described polar monomer, the above-described ester, AMPS®, and/or N-vinylpyrrolidone can be substituted for the above-described copolymer. The terpolymer can contain from about 50 to about 98.9 mole percent of the polar monomer, from about 0.01 to about 50 mole percent of the ester, and from about 1 to about 40 mole percent of the AMPS® or N-vinylpyrrolidone monomer. The tetrapolymer can contain from about 50 to about 97.9 mole percent of the polar monomer, from about 0.01 to about 50 mole percent of the ester, from about 1 to about 20 mole percent of AMPS®, and from about 1 to about 20 mole percent of N-vinylpyrrolidone. The terpolymer or tetrapolymer can be a block or non-block polymer, a regular or random polymer, or a graft polymer. Also the solubility, molecular weight, viscosity, production, and other properties of the terpolymer or tetrapolymer should generally be as described above for the copolymer.

The polymer is preferably soluble in water to the extent of at least 10 grams per liter in distilled water at 15 EC and 10 grams per liter in an aqueous sodium chloride solution containing 32 grams per liter of sodium chloride at 25 EC. If desired, the polymer can be mixed with a surfactant to facilitate its solubility in the water or salt solution utilized. The polymer can have an average molecular weight in the range of from about 50,000 to 20,000,000, most preferably from about 100,000 to about 500,000. A polymer having an average molecular weight of about 50,000 has a viscosity when dissolved in distilled water in the amount of about 3.6% by weight of the solution at 19 EC of from about 10 to about 500 centipoise. Preferably, the polymer is shear thinning whereby the viscosity reduces by at least 10% on increasing shear rate by 10%.

The organic gelling agent is capable of cross-linking the water-soluble polymer. The organic gelling agent suitable for use in accordance with this invention is selected from the group consisting of a polyalkylene imine, polyfunctional aliphatic amine, an aralkylamine, or a heteroaralkylamine. Additional details concerning these polymers and their preparation are disclosed in U.S. Pat. No. 3,491,049, the specification of which is incorporated herein by reference in its entirety. The preferred polyalkylenepolyamines are the polymeric condensates of lower molecular weight polyalkylenepolyamines and a vicinal dihaloalkane. The polyalkyleneimines are best illustrated by polymerized ethyleneimines or propyleneimine. The polyalkylenepolyamines are exemplified by polyethylene and polypropylenepolyamines. Other gelling agents which can be used include water-soluble polyfunctional aliphatic amines, aralkylamines, and heteroaralkylamines optionally containing other hetero atoms. Of these, polyethylene imine is most preferred.

Other organic gelling agents that are expected to be suitable for use in accordance with this invention are metal ion chelated water-soluble polymers capable of cross-linking the water-soluble polymer. The organic gelling agents may be chelated as described in U.S. Pat. No. 6,196,317, the specification of which is incorporated herein by reference in its entirety. Particularly suitable such water-soluble polymeric gelling agents are chelated polyethylene imines and polypropylene imines. Of these, chelated polyethylene imine is the most preferred. As mentioned, by chelating with a metal ion, the gelling agent is prevented from cross-linking the copolymer prematurely at high temperatures. That is, the polyalkyleneimine utilized is chelated with a metal ion selected from the group consisting of zirconium ion, cobalt ion, nickel ion, ferric ion, titanium IV ion, and copper ion. Of these, zirconium ion is the most preferred.

The formate brines have exhibited the ability to stabilize acrylamide co-polymers. They are both effective in stabilizing the base polymers and in stabilizing the cross-linked gels. The former is exhibited by the delays in cross-linking. The later is exhibited by the observed long-term stability of the material when subjected to high temperature. It is expected that this can be extrapolated to other water-soluble polymers, and at least to general polyacrylamides.

Without being limited by any theoretical explanation, it is believed that the effect of gel-time delay will be largest at lower temperatures. At the very high temperatures, it is believed that gel time is more controlled by thermolysis than hydrolysis, and it is believed that the hydrolysis rate is what is controlled by the formate.

Besides the observed delay in cross-link time, the use of formate brines also enables higher density fluid mixtures which previously could not be achieved. For example, using potassium formate, mixtures with a total fluid density of about 1.15 g/cm$^3$ (9.6 lbs/gal) can be achieved. Using cesium formate, mixtures with a total fluid density of about 1.5 g/cm$^3$ (12.5 lbs/gal) can be achieved. At higher densities, formate brines tend to precipitate out the polymers and cross-linkers.

Preferably, the water-soluble formate is selected from the group consisting of potassium formate and cesium formate ammonium formate, lithium formate, sodium formate, potassium formate, rubidium formate, cesium formate, and francium formate.

For downhole use, the composition of the invention contains water in which the polymer, gelling agent, and water-soluble formate are dissolved. These aqueous compositions are usually made up just before use by mixing the polymer and the gelling agent in an aqueous formate brine medium, and then injecting the aqueous composition into the formation. Any convenient source of water can be used, so long as it does not contain components that would adversely effect the compositions of the invention.

Most preferred compositions of this invention are comprised of combinations of the more preferred examples of water-soluble polymer, gelling agent, and water-soluble formate.

For example, in the more preferred compositions, (a) the water-soluble polymer is preferably a copolymer of: (i) at least one non-acidic ethylenically unsaturated polar monomer, and (ii) at least one copolymerisable ethylenically unsaturated ester, (b) the organic gelling agent is selected from the group consisting of a polyalkyleneimine, polyfunctional aliphatic amine, an aralkylamine, and a heteroaralkylamine; and the water-soluble formate is selected from the group consisting of ammonium formate, lithium formate, sodium formate, potassium formate, rubidium formate, cesium formate, and francium formate.

More preferably still, the ethylenically unsaturated polar monomer in the polymer is preferably an amide of an ethylenically unsaturated carboxylic acid, most preferably acrylamide. The ethylenically unsaturated ester in the copolymer is preferably formed of a hydroxyl compound and an ethylenically unsaturated carboxylic acid selected from the group of acrylic acid, methacrylic acid, crotonic acid, and cinnamic acid. The hydroxyl compound is preferably an alcohol having the formula ROH wherein R is a group selected from alkyl, alkenyl, cycloalkyl, aryl, arylalkyl, or an aromatic or heterocyclic group substituted with one or more groups selected from hydroxyl, ether, and thioether groups. Most preferably, the ethylenically unsaturated ester monomer is t-butyl acrylate.

Most preferably, the gelling agent is comprised of polyethylene imine.

The concentration of polymer in the aqueous composition is preferably from 500 to 100,000 ppm, in particular 500 to 10,000 ppm for polymers of molecular weight of at least 1 million, and from 10,000 to 100,000 ppm for polymers of molecular weight 50,000 to 1 million. Preferably, the concentration of the gelling agent in the aqueous composition is from 10 to 50,000 ppm, especially 10 to 1,000 ppm and 1,000 to 50,000 ppm, respectively, for the high and low molecular weight copolymers.

The presently most preferred compositions of this invention for reducing the permeability of a subterranean zone are comprised of a copolymer of acrylamide and t-butyl acrylate present in an amount of about 7% by weight of the water therein and a gelling agent comprised of polyethylene imine present in the composition in an amount of about 1% by weight of water therein. Using potassium formate, mixtures with a total fluid density of about 1.15 g/cm$^3$ (9.6 lbs/gal) can be achieved. Using cesium formate, mixtures with a total fluid density of about 1.5 g/cm$^3$ (12.5 lbs/gal) can be achieved.

It is to be understood, of course, that without undo experimentation, further examples and even more preferred compositions may be determined by the ordinary routineer with ordinary experimentation within the scope and spirit of the invention as defined herein.

In general, the methods of this invention for reducing the permeability of a subterranean zone are comprised of the steps of introducing an aqueous composition according to the invention into the zone, and then allowing the aqueous composition to form a cross-linked gel in the zone. The formation of the cross-linked gel in the zone reduces or completely blocks the permeability of the zone whereby fluid flow through the zone is reduced or terminated.

More particularly, these aqueous compositions are usually made up just before use by mixing the copolymer and the gelling agent in an aqueous medium, and then injecting the aqueous composition into the formation. The composition is preferably kept at below 50 EC, e.g., below 30 EC before use. The aqueous compositions may also contain other ingredients, e.g. antioxidants and/or oxygen scavengers.

The introduction of these compositions into the subterranean zone may, if desired, be preceded by a precooling treatment, e.g. with cold water to stop premature cross-linking, but preferably the injection process is performed without such a pretreatment.

The aqueous compositions may be injected into a formation via a producing well or via a secondary injection well (for use with a water flood or squeeze technique), for example. The aqueous compositions may simply be injected into the formation, but preferably they are forced into it by pumping.

The well may be shut in for 1–70 hours, for example, to allow the gelling to occur, and then production may be restarted.

The compositions of the invention have the benefit of a low tendency to cross-linking and gelling in the wellbore (i.e. reduced aggregate build-up) but rapid cross-linking at the high temperatures of the formation. They are, therefore, less susceptible to process handling problems, without the environmental and other problems associated with the use of metal cross-linking agents.

EXAMPLES

The invention is illustrated in the accompanying figures, which show graphical plots of viscosity against time for a series of compositions. The compositions were placed in a Rheometer at 40 rpm with external heating bath and the viscosity and time measured.

Table 1 below shows the experimental data obtained for the cross-link time delay at 120 EC (250 EF) of compositions containing:

(a) a water-soluble polymer;

(b) a gelling agent;

(c) either a control of potassium chloride or a water-soluble formate; and (d) water;

wherein the water-soluble polymer further comprises polyacrylamide t-butyl acrylate copolymer ("PatBA") at 7% by weight of the composition;

wherein the gelling agent further comprises polyethylene imine ("PEI") at 0.66% by weight of the composition;

wherein the water-soluble formate further comprises either potassium formate or cesium formate; and wherein the potassium chloride, potassium formate, or cesium formate and the water is present in an amount sufficient to obtain the stated final density of the composition when measured at 20 EC specified in Table 1.

TABLE 1

Cross-link time delay at 120° C. (250EF) of Conformance Gels: Base polymer solution contains 7% PatBA (Polyacrylamide t-butyl acrylate); Gelling agent of 0.66% PET (polyethyleneimine).

| Brine type | Final Density (g/cm$^3$ at 20$^E$C) | Time to 100 cp (min) | Time to 500 cp (min) | Time to 1000 cp (min) |
|---|---|---|---|---|
| 2% KCl | 1.022 | 63 | 74 | 85 |
| K-formate | 1.10 | 147 | 180 | 227 |
| K-formate | 1.15 | 184 | 230 | 314 |
| K-formate | 1.20 | 243 | 304 | 442 |
| Cs-formate | 1.10 | 83 | 93 | 99 |
| Cs-formate | 1.30 | 166 | 199 | 220 |
| Cs-formate | 1.50 | 237 | 325 | 447 |

FIG. 1 is a graph of the experimental data obtained for the cross-link time delay at 120 EC (250 EF) for the control vs. compositions with potassium formate.

Figure 2:
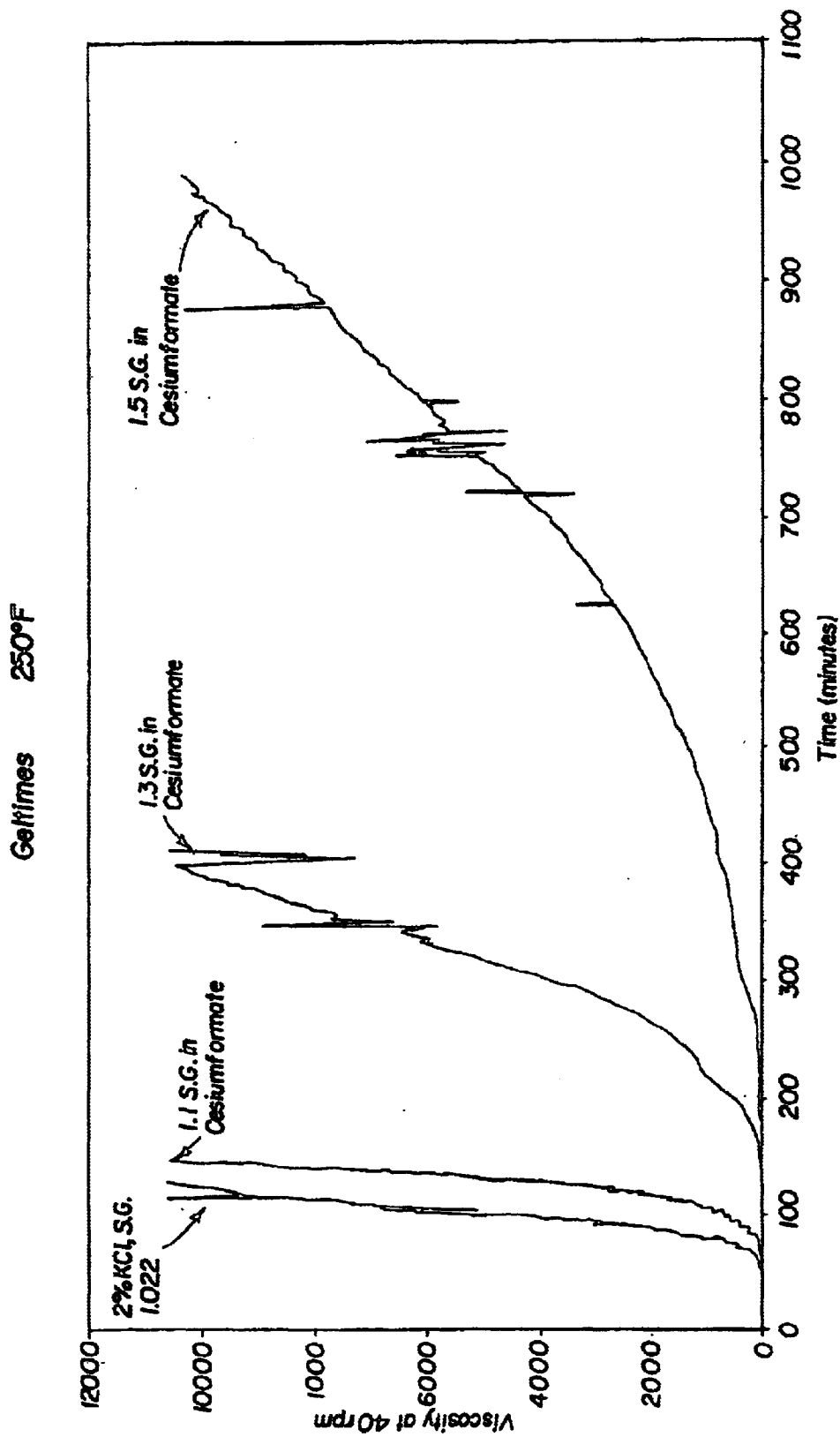
FIG. 2 is a graph of the experimental data obtained for the cross-link time delay at 120 EC (250 EF) for the potassium chloride control vs. compositions with cesium formate.

FIG. 2 is a graph of the experimental data obtained for the cross-link time delay at 120 EC (250 EF) for the control vs. compositions with cesium formate.

Table 2 below shows the experimental data obtained for the long-term stability at high temperature of the gelled compositions containing:

(a) a water-soluble polymer;

(b) a gelling agent;

(c) either a control of potassium chloride or a water-soluble formate; and (d) water;

wherein the water-soluble polymer further comprises polyacrylamide t-butyl acrylate copolymer ("PatBA") at 7% by weight of the composition;

wherein the gelling agent further comprises polyethylene imine ("PEI") at the weight percent concentration specified in Table 2;

wherein the water-soluble formate further comprises either potassium formate or cesium formate; and wherein the potassium chloride, potassium formate, or cesium formate and the water is present in an amount sufficient to obtain the stated final density of the composition when measured at 20$^E$C specified in Table 2.

TABLE 2

Long-term stability of Conformance Gels: Base polymer solution contains 7% PatBA (Polyacrylamide t-butyl acrylate).

| Cross-linker concentration (% w/w) | Brine Type | Total fluid density (g/mc$^3$) | % Gel Strength after 4 weeks at 335$^E$F |
|---|---|---|---|
| 2.0 | 2% KCl | 1.022 | 40 |
| 1.5 | 2% KCl | 1.022 | 50 |
| 1.0 | 2% KCl | 1.022 | 60 |
| 0.66 | 2% KCl | 1.022 | 60 |
| 2.0 | Cs-formate | 1.40 | 70 |
| 1.5 | Cs-formate | 1.40 | 80 |
| 1.0 | Cs-formate | 1.40 | 95 |
| 0.66 | Cs-formate | 1.40 | 95 |
| 2.0 | Cs-formate | 1.60 | 70 |
| 1.5 | Cs-formate | 1.60 | 80 |
| 1.0 | Cs-formate | 1.60 | 90 |
| 0.66 | Cs-formate | 1.60 | 95 |

As can be seen for these examples, the formate brines have exhibited the ability to stabilize acrylamide copolymers. They are both effective in stabilizing the base polymers and in stabilizing the cross-linked gels. The former is exhibited by the delays in cross-linking. The later is exhibited by the observed long-term stability of the material when subjected to high temperature. It is expected that these examples can be extrapolated to other water-soluble polymers, and at least to general polyacrylamides.

Thus, the present invention is well adapted to carry out the objects and attain the ends and advantages mentioned as well as those which are inherent therein. While numerous changes may be made by those skilled in the art, such changes are encompassed within the spirit and scope of this invention as defined by the appended claims.

What is claimed is:

1. A composition for use in a subterranean formation, the composition comprising:

(a) at least one water-soluble polymer;

(b) at least one organic gelling agent selected from the group consisting of a polyalkyleneimine, polyfunctional aliphatic amine, an aralkylamine, and a heteroaralkylamine; and (c) at least one water-soluble formate.

2. A composition for use in a subterranean formation, the composition comprising:

(a) at least one water-soluble polymer;

(b) at least one organic gelling agent selected from the group consisting of a polyalkyleneimine, polyfunctional aliphatic amine, an aralkylamine, and a heteroaralkylamine; and (c) at least one water-soluble formate selected from the group consisting of ammonium formate, lithium formate, sodium formate, potassium formate, rubidium formate, cesium formate, and francium formate.

3. A composition for use in a subterranean formation, the composition comprising:

(a) at least one water-soluble polymer further comprising a polymer of at least one non-acidic ethylenically unsaturated polar monomer;

(b) at least one organic gelling agent selected from the group consisting of a polyalkyleneimine, polyfunctional aliphatic amine, an aralkylamine, and a heteroaralkylamine; and (c) at least one water-soluble formate.

4. A composition for use in a subterranean formation, the composition comprising:

(a) at least one water-soluble polymer further comprising a polymer of at least one non-acidic ethylenically unsaturated polar monomer;

(b) at least one organic gelling agent selected from the group consisting of a polyalkyleneimine, polyfunctional aliphatic amine, an aralkylamine, and a heteroaralkylamine; and (c) at least one water-soluble formate selected from the group consisting of ammonium formate, lithium formate, sodium formate, potassium formate, rubidium formate, cesium formate, and francium formate.

5. A composition for use in a subterranean formation, the composition comprising:

(a) at least one water-soluble polymer further comprising a copolymer of:

(i) at least one non-acidic ethylenically unsaturated polar monomer, and (ii) at least one copolymerisable ethylenically unsaturated ester;

(b) at least one organic gelling agent selected from the group consisting of a polyalkyleneimine, polyfunctional aliphatic amine, an aralkylamine, and a heteroaralkylamine; and (c) at least one water-soluble formate.

6. A composition for use in a subterranean formation, the composition comprising:
   (a) at least one water-soluble polymer further comprising a copolymer:
      (i) at least one non-acidic ethylenically unsaturated polar monomer, and
      (ii) at least one copolymerisable ethylenically unsaturated ester;
   (b) at least one organic gelling agent selected from the group consisting of a polyalkyleneimine, polyfunctional aliphatic amine, an aralkylamine, and a heteroaralkylamine; and
   (c) at least one water-soluble formate selected from the group consisting of ammonium formate, lithium formate, sodium formate, potassium formate, rubidium formate, cesium formate, and francium formate.

7. The composition according to any one of claims 1, 2, 3, 4, 5, or 6, further comprising water, whereby the water-soluble polymer, the gelling agent, and the water-soluble formate are in an aqueous solution.

8. The composition according to claim 7, wherein the water-soluble formate is present in an amount sufficient to make the density of the aqueous composition at least 1.1 g/cm$^3$ when measured at 20° C.

9. The composition according to any one of claims 1, 2, 3, 4, 5, or 6, wherein the water-soluble polymer is soluble in water to an extent of at least 10 g/l when measured in distilled water at 15° C. and at least 10 g/l when measured in an aqueous sodium chloride solution containing 32 g/l of sodium chloride at 25° C.

10. The composition according to any one of claims 1, 2, 3, 4, 5, or 6 wherein the polymer has a molecular weight average of at least 50,000.

11. The composition according to any one of claims 3, 4, 5, or 6, wherein the ethylenically unsaturated polar monomer is acrylamide.

12. The composition according to any one of claims 5, or 6, wherein the copolymerisable ethylenically unsaturated ester is t-butyl ester.

13. The composition according to any one of claims 5, or 6, wherein the copolymer is polyacrylamide t-butyl acrylate.

14. The composition according to any one of claims 1, 2, 3, 4, 5, or 6, wherein the gelling agent is polyethylene imine.

15. A method of reducing the permeability of a subterranean zone, the method comprising the steps of:
   (a) introducing into a subterranean zone an aqueous solution of a composition as claimed in any of claims 1, 2, 3, 4, 5, or 6; and
   (b) allowing the composition to gel.

16. The method according to claim 15, further comprising the step of producing hydrocarbons from the subterranean zone.

17. A composition for use in a subterranean formation, the composition comprising:
   (a) at least one water-soluble polymer further comprising a polymer of at least one acrylamide monomer;
   (b) at least one organic gelling agent selected from the group consisting of a polyalkyleneimine. polyfunctional aliphatic amine. an aralkylamine. and a heteroaralkylamine; and
   (c) at least one water-soluble formate.

18. A composition for use in a subterranean formation, the composition comprising:
   (a) at least one water-soluble polymer further comprising a polymer of at least one non-acidic ethylenically unsaturated polar monomer;
   (b) at least one polyethylene imine capable of crosslinking the water-soluble polymer; and
   (c) at least one water-soluble formate.

19. A composition for use in a subterranean formation, the composition comprising:
   (a) at least one water-soluble polymer further comprising a copolymer of:
      (i) at least one non-acidic ethylenically unsaturated polar monomer, and
      (ii) at least one t-butyl ester;
   (b) at least one organic gelling agent capable of crosslinking the water-soluble polymer; and
   (c) at least one water-soluble formate selected from the group consisting of ammonium formate, lithium formate, sodium formate, potassium formate, rubidium formate, cesium formate, and francium formate.

20. A composition for use in a subterranean formation, the composition comprising:
   (a) at least one water-soluble polymer further comprising a copolymer of polyacrylamide t-butyl acrylate.
   (b) at least one organic gelling agent capable of crosslinking the water-soluble polymer; and
   (c) at least one water-soluble formate selected from the group consisting of ammonium formate, lithium formate, sodium formate, potassium formate, rubidium formate, cesium formate, and francium formate.

21. A composition for use in a subterranean formation, the composition comprising:
   (a) at least one water-soluble polymer further comprising a copolymer of:
      (i) at least one non-acidic ethylenically unsaturated polar monomer, and
      (ii) at least one copolymerisable ethylenically unsaturated ester;
   (b) at least one polyethylene imine capable of crosslinking the water-soluble polymer; and
   (c) at least one water-soluble formate selected from the group consisting of ammonium formate, lithium formate, sodium formate, potassium formate, rubidium formate, cesium formate, and francium formate.

22. A composition for use in a subterranean formation, the composition comprising:
   (a) at least one water-soluble polymer comprising at least one t-butyl ester;
   (b) at least one organic gelling agent capable of crosslinking the water-soluble polymer; and
   (c) at least one water-soluble formate.

23. A composition for use in a subterranean formation, the composition comprising:
   (a) at least one water-soluble polymer comprising a copolymer of polyacrylamide t-butyl acrylate;
   (b) at least one organic gelling agent capable of crosslinking the water-soluble polymer; and
   (c) at least one water-soluble formate.

24. A composition for use in a subterranean formation, the composition comprising:
   (a) at least one water-soluble polymer;
   (b) at least one organic gelling agent capable of crosslinking the water-soluble polymer, wherein the organic gelling agent comprises polyethylene imine; and
   (c) at least one water-soluble formate.

* * * * *